Aug. 3, 1948.  D. D. DEMAREST  2,446,364
FILTERING DEVICE
Filed Oct. 11, 1945

INVENTOR
DANIEL DOUGLAS DEMAREST
BY
Moses, Nolte, Crews and Berry
ATTORNEYS

Patented Aug. 3, 1948

2,446,364

UNITED STATES PATENT OFFICE 2,446,364

FILTERING DEVICE

Daniel Douglas Demarest, Little Neck, N. Y.

Application October 11, 1945, Serial No. 621,815

6 Claims. (Cl. 210—167)

This invention relates to fluid filtering devices and more particularly to filters for motor lubricating and fuel oils.

It is an object of the present invention to provide an improved oil or fuel filter for use with hydrocarbon engines.

It is another object of the invention to provide a fluid filtering device which is self-cleaning.

It is still another object of the invention to provide a filtering device in which the impurities or sediment can be removed without interfering with the operation of the oiling or fueling system.

According to the invention, a filtering element is rotated within the filter housing by the engine to which the filter may be attached. Within the housing, means is provided for increasing the pressure of the incoming fluid. A small percentage of the high pressure fluid is directed through the rotating filtering element in a reverse direction to the major flow of the fluid therethrough whereby to effect a cleaning action upon the filtering element. The cleaning portion of the fluid passes through only a small part of the total filtering element at any instant but with one rotation of the element the entire filtering element is cleaned. The rotation of the filtering element may be continuous or intermittent as desired. The impurities or foreign matter deposited on the filtering element are worked loose therefrom and caused to drop down into a sump from which they are readily drained and without thus interfering with the operation of the oiling system. The filter is thus always maintained in a clean condition by forcing a small amount of fluid through the screen in the reverse direction to the main flow. The filtering element is made of sintered powdered material similar to that of the ordinary filter used in some Diesel engine injection feed lines. A bypass or safety valve is provided in the inlet passage to bypass heavy or cold oil not susceptible to filtering action, or the normal fluid flow should the filtering element become clogged.

For other objects and for a better understanding of the invention, reference may be had to the following detailed description taken in connection with the accompanying drawing, in which Fig. 1 is an elevational view of the main filter body with the filter cover and filtering element removed;

Figure 2:
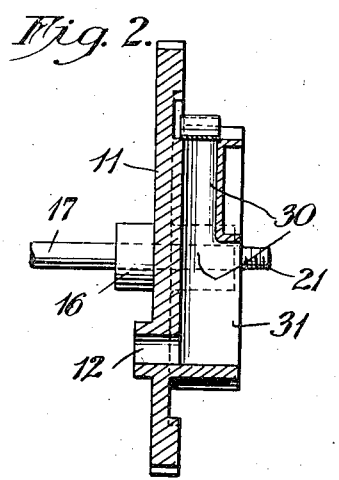
Fig. 2 is a cross-sectional view of that part of the filter shown in Fig. 1 and taken along the line 2—2 thereof.
Figure 1:
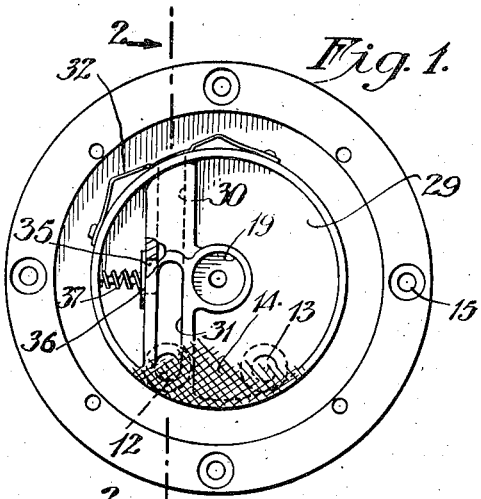
Figure 4:
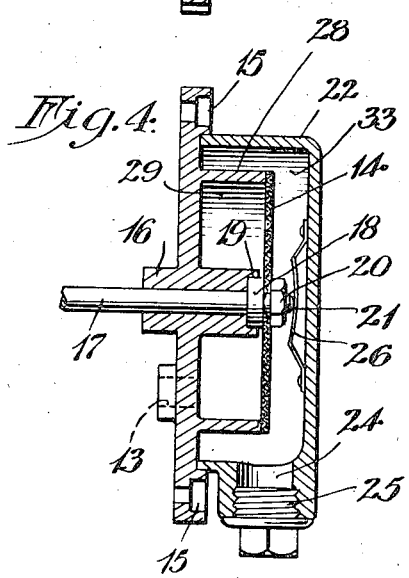
Fig. 4 is a cross-sectional view of the assembled filter, taken along the line 4—4 of Figure 3 and looking in the direction of the arrows thereof.
Figure 3:
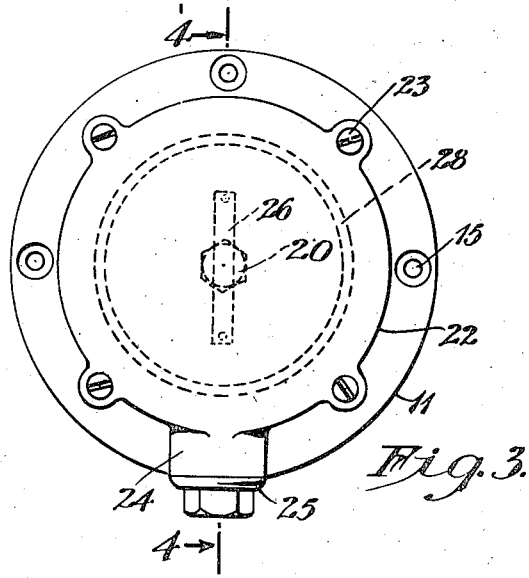
Fig. 3 is an elevational view of the assembled filter looking at the cover face thereof.
Figure 5:
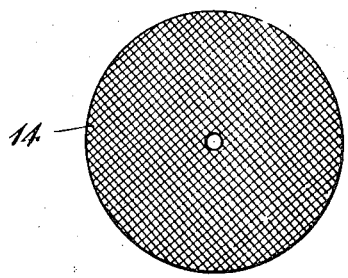
Fig. 5 is a plan view of the filtering element or disc.

Referring now to the figures, there is a main body or casting 11 provided with an inlet 12 and an outlet 13. The oil enters the inlet 12, passes through a filtering element 14 and then leaves the filter through the outlet port 13. The main body 11 is adapted to be attached to an engine by fastening screws passing through screw openings 15 in the periphery thereof. In the center of the main body there is a bearing portion 16, Fig. 3, through which extends a shaft 17 adapted to be driven by some moving part of the engine or some other agency or by its own motor. This shaft 17 can be rotated continuously or intermittently as desired.

On the inner end of the shaft 17 is a shoulder 18 adapted to fit within a recess 19 of the hub and so as to hold the shaft against axial displacement from the filter when the filtering element 14 is removed therefrom. The shoulder 18 also serves as a backing for the filtering element 14 and the filtering element 14 is secured thereto by a clamping nut 20 tightened over a threaded portion 21 of the shaft.

A cup-shaped cover 22 is secured by four fastening screws 23 to the main body 11. This cover has a sump 24 into which is threaded a removable drain plug 25. This cover 22 carries a spring 26 which presses against the threaded end 21 of the shaft 17 to hold the filtering element 14 in its proper position and against axial displacement and with shaft shoulder 18 in the hub recess 19. On the main body 11 is a cylindrically shaped flange 28 adapted to provide an internal or outlet chamber 29.

Oil entering the inlet 12 passes into a main small passage means or passageway 30 extending across the chamber 29 and through one side of the flange 28. Extending from this main passageway 30 is a secondary branch passageway having at its discharge end an elongated opening 31 covered by the filtering element 14. The end of this passage 30 at the point where it leaves the flange 28 is covered by a light spring valve 32 which creates a difference in pressure between the oil in the passage and the oil externally within a space 33 in the cover constituting an inlet chamber. From this space 33, the oil passes through the filtering element to chamber 29 and outlet 13.

The oil in the passage 30 is thus given a higher pressure than the oil in the cover chamber 33. This higher pressure causes the oil in the passage 30 to press against the discharge side of the filtering element through the elongated opening 31 as the element passes thereover and produces a counter flow through the filtering element which loosens the sediment deposited on the face of the filtering element at the cover chamber side thereof. The sediment loosened from the filtering element settles into the sump 24 from which it can be readily drained by removal of drain plug 25.

It is apparent that any shape of filtering element can be substituted for the flat disc type of filtering element 14. For instance, this filtering element may be of cylindrical shape if desired. Likewise, the filtering element may be of different material than the sintered powdered metal which is used.

A by-pass opening 35 is provided in the passage 30 so that in case the filtering element becomes clogged or the oil is too heavy or too cold to pass readily therethrough, the filtering element may be by-passed and the fluid allowed to be delivered directly to the chamber 29 and outlet 13. The opening 35 is covered by a valve disc 36 which is normally biasingly retained thereover by a valve spring 37. Fluid thus unable to be passed through the filtering element builds up a pressure between the filtering element and the cover, causing the same to back up in the passage 30 until the pressure of by-pass valve spring 37 is overcome.

In the operation of the filtering device of the present invention, the fluid to be filtered enters the inlet 12 into the passage 30, and during normal operations, the major portion thereof passes through the spring valve 32 and into the external chamber 33. From there, the fluid passes from the outer side of the filtering element 14, through said element in one direction, and into the internal chamber 29. From this chamber 29, the filtered fluid is discharged through the outlet 13. A small part of the fluid entering the passage 30 is discharged through the elongated opening 31 of said passage, and passes from the inner side of the filtering element 14 through said element in an opposite direction from that occurring in the main filtering action and into the external chamber 33. For cleaning action, the filtering element 14 is rotated, so that the foreign matter collected thereon on the outer side of said element is loosened by the action of the fluid discharged through the opening 31 from the inner side of said element to the outer side and drops into the sump 24. This foreign matter may be drained out by removing the plug 25.

I have described what I believe to be the best embodiments of my invention. I do not wish, however, to be confined to the embodiments shown, but what I desire to cover by Letters Patent is set forth in the appended claims.

I claim:

1. A fluid filtering device comprising an inlet chamber and an outlet chamber in adjoining relationship and including a filtering element separating said chambers, said filtering element having on its inlet side, substantially all of its active filtering area at all times exposed to and in direct flow communication with said inlet chamber, an inlet, an outlet for said outlet chamber, a main passageway for conducting the major portion of the fluid from said inlet to said inlet chamber, the fluid delivered to said inlet chamber being adapted to flow to the inlet side of said filtering element, through said filtering element in one direction and into said outlet chamber for discharge through said outlet, a secondary passageway for diverting a minor portion of the fluid from said inlet directly to a portion of the outlet side of said filtering element for flow through said filtering element in an opposite direction and into said inlet chamber, whereby the sediment collected on said filtering element on its inlet side is loosened by the flow of fluid through said filtering element from said portion of the outlet side, said secondary passageway on its discharge end being located against a section of said filtering element directly opposite said inlet chamber and having a cross-section of minor area with respect to the total active filtering area of said filtering element, means for automatically maintaining the pressure at the discharge end of said secondary passageway substantially higher than the pressure in said inlet chamber, to permit the sediment loosening fluid to flow from the discharge end of said secondary passageway through said filtering element and into said inlet chamber, and means for moving said filtering element with respect to the discharge end of said secondary passageway to present different sections of said filtering element to the cleaning action of the fluid in said secondary passageway.

2. A fluid filtering device as described in claim 1, said filtering element being substantially circular and being mounted for rotation about its center, said secondary passageway at its discharge end having a cross-section, extending from a section near the center of said filtering element to a section near its outer periphery.

3. A fluid filtering device as described in claim 1, in which said pressure maintaining means comprises an automatically operable valve in said main passageway beyond said secondary passageway.

4. A fluid filtering device as described in claim 1, comprising an automatically operable valve at the discharge end of said main passageway where it discharges into said inlet chamber.

5. A fluid filtering device as described in claim 1, comprising a sump in the lower section of said inlet chamber, and a normally closed discharge opening for said sump, adapted to be opened to permit discharge therefrom of the sediment removed from the filtering element and deposited in said sump.

6. In a fluid filtering device, the combination comprising an outlet chamber having an end wall, an annular flange secured at one end to said wall and a circular filtering element positioned against the other end of said flange, means supporting said filtering element for rotation, a casing around said outlet chamber defining therewith an inlet chamber, an inlet, an outlet for said outlet chamber, a main passageway for conducting the major portion of the fluid from said inlet to said inlet chamber, the fluid delivered to said inlet chamber being adapted to flow to one side of said filtering element, through said filtering element in one direction and into said outlet chamber for discharge through said outlet, a secondary passageway for diverting a minor portion of the fluid from said inlet directly to the other side of said filtering element for flow through said filtering element in an opposite direction, whereby the sediment collected on said filtering element on its inlet chamber side is loosened by the flow of fluid through said filtering element from said other side, said secondary passageway on its discharge end being located against said filtering element directly opposite said inlet chamber and having a cross-section of minor area with respect to the total active filtering area of said filtering element, said filtering element having the section thereof opposite the discharge end of said secondary passageway exposed on its inlet side directly to said inlet chamber, whereby the sediment loosening fluid discharged from said secondary passageway and through said filtering element, discharges directly into said inlet chamber and joins therein the fluid discharged into said inlet chamber from said main passageway.

DANIEL DOUGLAS DEMAREST.

REFERENCES CITED

The following references are of record in the file of this patent:

UNITED STATES PATENTS

| Number | Name | Date |
|---|---|---|
| 1,585,817 | Bailey et al. | May 25, 1926 |
| 2,066,479 | MacIsaac | Jan. 5, 1937 |
| 2,077,589 | Seaver et al. | Apr. 20, 1937 |
| 2,099,502 | Stockdale | Nov. 16, 1937 |
| 2,119,433 | Haught | May 31, 1938 |
| 2,183,577 | McNeal | Dec. 19, 1939 |
| 2,184,177 | Burrell | Dec. 19, 1939 |
| 2,310,587 | MacNeill | Feb. 9, 1943 |
| 2,390,539 | Katcher | Dec. 11, 1945 |